W. LAMPERT & H. HUBER.
PRETZEL MACHINE.

No. 184,786. Patented Nov. 28, 1876.

WITNESSES.
Thomas Bernard
J. Wm. Sister

William Lampert
Henry Huber
INVENTORS

Edwin Brothers
ATTORNEYS

UNITED STATES PATENT OFFICE.

WILLIAM LAMPERT AND HENRY HUBER, OF CRESTLINE, OHIO.

IMPROVEMENT IN PRETZEL-MACHINES.

Specification forming part of Letters Patent No. 184,786, dated November 28, 1876; application filed April 29, 1876.

*To all whom it may concern:*

Be it known that we, WILLIAM LAMPERT and HENRY HUBER, of Crestline, in the county of Crawford and State of Ohio, have invented certain new and useful Improvements in Machines for Making Pretzels; and we do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1:
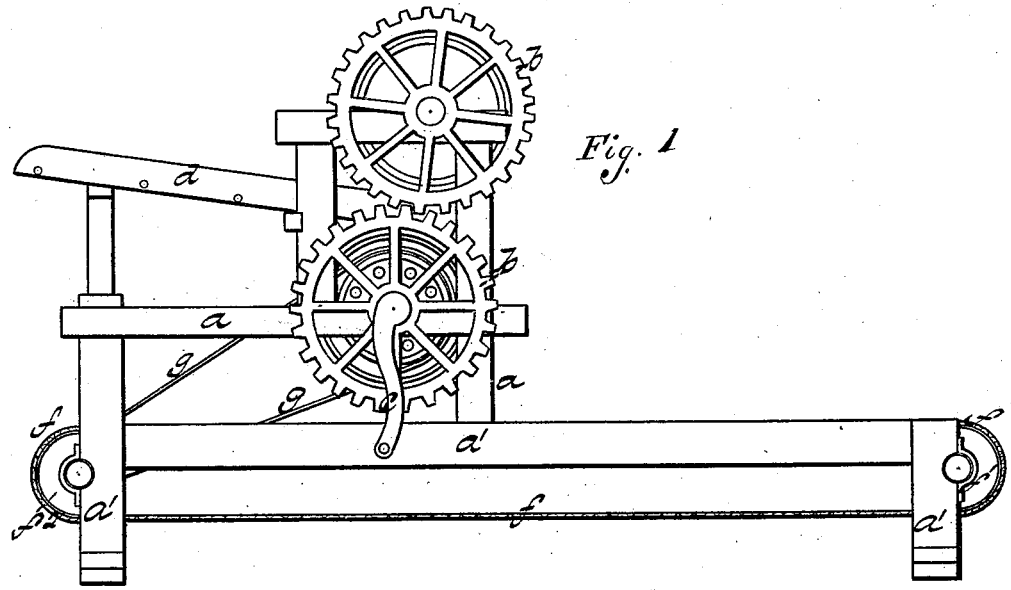
Figure 2:
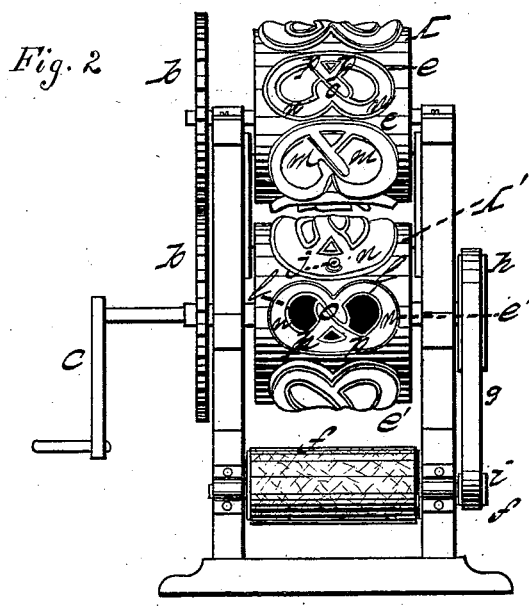
Figure 3:
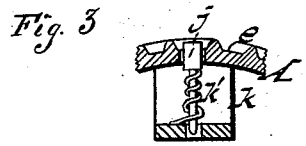
Figure 4:
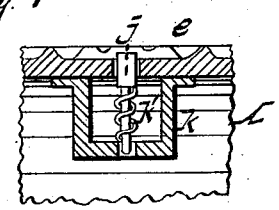

Figure 1 is a side elevation of our improved pretzel-making machine. Fig. 2 is an end elevation; and Figs. 3 and 4, detached sectional views thereof.

Corresponding parts in the several figures are designated by like letters.

This invention relates to a certain improvement in pretzel-machines; and it consists of two or more cylinders, disposed one above the other, and having cutters or dies of a pretzel shape, and one having certain portions of its surface in relief or raised, and the other certain portions perforated or supplied with openings, substantially as hereinafter more fully set forth.

In the annexed drawings, A A' refer to two cylinders, mounted one above the other upon a frame, $a\,a$, supported upon a second frame, $a'\,a'$. Upon the extended portions of the axes of the cylinders A A' are toothed or cogged wheels $b\,b$, gearing with each other, and for imparting joint motion to the said cylinders.

The machine may be run by hand by grasping and turning the handle $c$ upon the axis of one of the cylinders A A', or by other means or motor.

$d$ is a trough, suitably secured in position for feeding the dough from which the pretzels are to be made to the cylinders. Upon the peripheries of the cylinders are cutters or dies $e\,e'$, of the shape of a pretzel, substantially as shown in Fig. 2, to give the desired shape to the dough passing between them, and which, after receiving the impression of, and being cut by, the said cutters or dies, falls upon the delivering apron or belt $f$, upon pulleys or drums $f^1 f^2$ in the frame $a'\,a'$.

Motion is imparted to the apron or belt $f$ by a belt, $g$, passing around a pulley, $h$, upon the axis of one of the cylinders A A' and a pulley, $i$, upon the axis of the drum or pulley $f^2$ of the delivering-apron $f$.

To expel the pretzel or pretzels from the dies or cutters $e\,e'$ of the lower cylinder, which receives the dough, a short projection or stud, $j$, is supplied to each of said dies or cutters $e\,e'$, and extended inwardly therefrom within a receptacle, $k$, and possessed of a spring, $k'$, by which it is projected after the compression of the said spring, to produce the result above stated.

The dies or cutters $e\,e'$ of the lower cylinder may have their blank portions left open or perforated, as shown at $l\,l$, to allow the scraps or surplus dough, in part, to drop into the cylinder, and the corresponding surfaces or portions of the dies or cutters $e\,e'$ upon the upper cylinder projected beyond the face of the same, as shown at $m\,m$, to force the surplus dough or scraps through the openings $l\,l$ of the dies or cutters of the lower cylinder.

A duplication of the stud or projection $j$ and spring $k'$ may be applied to each of the cutters or dies of the upper cylinder to expel the pretzels therefrom.

The pretzel-shaped cutters or dies consist of the heart-shaped or circular grooves $n$, with their walls in relief upon the periphery of the cylinders. The converging portions of the grooves $n$ are twisted, as at $o$, in the center of their circular or heart-shaped portion, and carried and united to the latter, as at $p\,p$.

Having thus described our invention, what we claim, and desire to secure by Letters Patent, is—

The cylinders A A', disposed one above the other, and having the cutters or dies $e\,e'$ of a pretzel shape, with the projections or raised surfaces $m\,m$ and openings $l\,l$, substantially as and for the purpose set forth.

In testimony that we claim the foregoing as our own we hereunto affix our signatures in presence of two witnesses.

WILLIAM LAMPERT.
HENRY HUBER.

Witnesses:
B. F. MILLER,
DAN. BABST, Jr.